United States Patent [19]
Sugimoto et al.

[11] Patent Number: 5,993,033
[45] Date of Patent: Nov. 30, 1999

[54] LEVELLING APPARATUS FOR VEHICLE LAMP

[75] Inventors: Atsushi Sugimoto; Masaaki Ishikawa, both of Shizuoka, Japan

[73] Assignee: Koito Manufacturing Co., Ltd., Tokyo, Japan

[21] Appl. No.: 09/053,753

[22] Filed: Apr. 2, 1998

[30] Foreign Application Priority Data

Apr. 4, 1997 [JP] Japan ................................. 9-086338

[51] Int. Cl.⁶ .................................................. F21Q 1/00
[52] U.S. Cl. ......................................... 362/515; 362/324
[58] Field of Search ................................. 362/514, 515, 362/324, 322, 287, 289, 421, 427

[56] References Cited

U.S. PATENT DOCUMENTS

| | | | |
|---|---|---|---|
| 4,471,413 | 9/1984 | Dick | 362/289 X |
| 4,689,725 | 8/1987 | Saijo et al. | 362/289 X |
| 4,843,523 | 6/1989 | Nakamura | 362/515 |
| 4,916,587 | 4/1990 | Hirose et al. | 362/66 |
| 5,107,406 | 4/1992 | Sekido et al. | 362/421 X |
| 5,381,317 | 1/1995 | Schmitt et al. | 362/515 |
| 5,508,896 | 4/1996 | Suehiro et al. | 362/66 |
| 5,580,149 | 12/1996 | Kusagaya | 362/66 |
| 5,735,656 | 4/1998 | Marvell et al. | 362/515 X |
| 5,743,618 | 4/1998 | Fujino et al. | 362/515 X |

*Primary Examiner*—Laura K. Tso
*Attorney, Agent, or Firm*—Sughrue, Mion, Zinn Macpeak & Seas, PLLC

[57] ABSTRACT

An apparatus for leveling a vehicle lamp such that an opening of the pivot receiving body is formed in a non-circular shape; the cross sectional shape of the pivot body in a direction perpendicular to the axis of the pivot body is formed so that the pivot body can be inserted into the opening of the pivot receiving body in at least one direction; and the cross sectional shape of the pivot body cannot be inserted into the opening of the pivot receiving body in at least the other direction; and the pivot body is prevented from slipping off the pivot receiving body by turning the pivot body by a predetermined angle around the axis of the pivot body after the pivot body is inserted into the pivot receiving body.

10 Claims, 14 Drawing Sheets

LEVELLING APPARATUS FOR VEHICLE LAMP

BACKGROUND OF THE INVENTION

The present invention relates to a novel apparatus for leveling a vehicle lamp. More particularly, the present invention relates to a technique for facilitating the coupling of an adjusting rod and a slanting member together in a leveling apparatus in order to improve efficiency in coupling both of them together and also prevent the deformation of and damage to a coupling member.

Some vehicle lamps, for example, automobile head lamps are equipped with a leveling function, that is, the function of correcting an irradiating direction every time that direction is biased upward or downward because the number of passengers on board or the weight of loaded goods varies.

Such a head lamp normally comprises a leveling mechanism fixed to a vehicle body or a vehicle-body-side member, the leveling mechanism including an adjusting rod which is moved back and forth by a proper driving device, and a coupling member which is provided in a head lamp unit or in the slanting end portion of the slanting member of a reflector and coupled to the front end portion of the adjusting rod, so that the slanting member is slanted/tilted upward or downward by moving the adjusting rod back and forth.

FIG. 1 is a schematic diagram showing an example 100 of a vehicle head lamp having the leveling mechanism.

In FIG. 1, 101 represents a head lamp unit whose back side is supported at three points of a vehicle body (not shown), and these three support points are positioned so that two of them are situated in two places which are closer to upper end of the head lamp unit 101, and properly separated from each other in the lateral/horizonal direction, the remaining one being perpendicularly separated downward from one of the two support points in the respective two places.

With a line defined by connecting the two support points (not shown) separated from each other in the horizontal direction closer to the upper end out of the three support points as a slanting axis c, the head lamp unit 101 is slanted/tilted by longitudinally moving the remaining support point (hereinafter called "leveling point"), which will be described later.

The lower end portion of the head lamp unit 101 is protruded downward and a pivot receiving body 103 is mounted on that protruded portion. A backwardly-open spherical recessed portion 104 is formed in the pivot receiving body 103.

Further, in FIG. 1, 105 represents a leveling mechanism fixed to the vehicle body, and a driving mechanism (not shown) is provided in its casing 106. A piston rod 107 axially extending in the longitudinal direction is provided so as to be axially moved by the driving mechanism, and a spherical pivot body 108 to be fitted into the spherical recessed portion 104 is formed in the front end portion of the piston rod 107. The pivot body 108 is pivotally inserted into the spherical recessed portion 104 of the pivot receiving body 103, whereby the lower-side support point among the aforesaid three support points, that is, a leveling point is defined.

More specifically, as shown in FIGS. 1 and 2, the pivot receiving body 103 forms a substantially cylindrical body with one end opening, and its inner surface forms the spherical recessed portion 104. The open mouth 109 is smaller in diameter than the spherical recessed portion 104, and three slits 111, 111, 111 parallel to each other are axially formed in the peripheral wall 110 of the pivot receiving body 103, whereby elastic pieces m, m, m having elasticity in a direction perpendicular to the axis in the open-end-side portion of the peripheral wall 110 of the pivot receiving body 103.

As shown in FIG. 3, when the pivot body 108 is inserted into the pivot receiving body 103, the pivot body 108 is put to the open mouth 109 of the pivot receiving body 103 while the axis of the pivot body 108 and that of the pivot receiving body 103 are kept aligned and then pressed into the spherical recessed portion 104.

Then the elastic pieces m, m, m of the peripheral wall 110 are elastically bent outward as the pivot body 108 is fitted in. As a result, the diameter of the open mouth 109 of the pivot receiving body 103 is enlarged and the pivot body 108 is inserted into the spherical recessed portion 104, as shown in FIG. 4.

The elastic pieces m, m, m of the peripheral wall 110 are restored to the original condition after the pivot body 110 is inserted into the pivot receiving body 103, whereby the pivot body 108 is pivotally received into the spherical recessed portion 104 of the pivot receiving body 103 and prevented from slipping off the spherical recessed portion 104.

When the piston rod 107 is moved, the lower protruded portion of the head lamp unit 101 is substantially longitudinally moved, so that the head lamp unit 101 is slanted with the slanting axis c as a slanting center. Thus, the irradiating direction of the head lamp unit 101 is vertically adjusted.

With the vehicle head lamp 100 like this, the elastic pieces m, m, m of the pivot receiving body 103 are always required to be bent when the pivot body 108 is inserted into the pivot receiving body 103 and since the pivot body 108 is inserted into the pivot receiving body 103 against the elastic force of the elastic pieces m, m, m, pressing force needs applying to a certain extent. Moreover, the pivot receiving body 103 will fail to follow the movement of the piston rod 107 unless the elastic force of the elastic pieces m, m, m is kept greater to some degree in order to prevent the piston rod 107 from backlashing after the pivot body 108 has been inserted.

Therefore, it is inevitable to conduct the coupling operation with a certain amount of strong force when the pivot body 108 is inserted into the pivot receiving body 103, so that the coupling operation therebetween is not easy.

The pivot body 108 and the pivot receiving body 103 are not always coupled together in such a state that the axes of them are kept aligned and if the axes of them are slightly shifted from each other, greater force must be applied to the shifted elastic piece 112 and them there is a possibility that the elastic piece 112 may be deformed or damaged. This is a problem.

SUMMARY OF THE INVENTION

It is therefore an object of the present invention to provide a leveling apparatus for a vehicle lamp in which a pivot body and a pivot receiving body are easily coupled together and also a coupling member is prevented from being deformed and damaged.

In order to solve the problems above, an apparatus for leveling a vehicle lamp according to the present invention is such that an opening of the pivot receiving body is formed in a non-circular shape; the cross sectional shape of the pivot body in a direction perpendicular to the axis of the pivot body is formed so that the pivot body can be inserted into the opening of the pivot receiving body in at least one direction; and the cross sectional shape of the pivot body cannot be inserted into the opening of the pivot receiving body in at least the other direction; and the pivot body is prevented from slipping off the pivot receiving body by turning the pivot body by a predetermined angle around the axis of the pivot body after the pivot body is inserted into the pivot receiving body.

In addition, the above-mentioned object can be achieved by a leveling apparatus for a vehicle lamp, according to the present invention, comprising:

a stationary member fixed to a vehicle body;

a slanting member tiltably supported with respect to the stationary member so as to adjust an optical axis of the vehicle lamp;

a pivot receiving body disposed on the slanting member; and an actuator coupled with the pivot receiving body for vertically slanting the slanting member, the actuator including a driving rod with a pivot body which is formed at a tip end of the driving rod and is coupled with the pivot receiving body, the pivot body being formed in a non-circular shape in a cross-section perpendicular to an axial direction of the driving rod;

wherein the pivot receiving body is provided with a recessed receptacle portion into which the pivot body is inserted and an opening communicating with the recessed receptacle portion;

the pivot body is insertable and releasable through the opening into and from the recessed receptacle portion in the axial direction while the pivot body is in a first posture, and the opening is capable of preventing the pivot body from being inserted into and released from the recessed receptacle portion in the axial direction while the pivot body is in a second posture which is defined by turning the pivot body in the first posture about the axial direction by a predetermined angle.

In the above-mentioned construction of the leveling apparatus for a vehicle lamp according to the present invention, advantageously, the pivot receiving body comprises a plurality of elastic pieces which define the opening.

Further, in the above-mentioned construction of the leveling apparatus for a vehicle lamp according to the present invention, advantageously, the recessed receiving portion is arcuate in a cross section in a plane containing a rotational axis of the rod, and is extended in a vertical direction perpendicular to the axial direction.

Furthermore, in the above-mentioned construction of the leveling apparatus for a vehicle lamp according to the present invention, advantageously, one end of the recessed receiving portion in the vertical direction is opened.

Moreover, in the above-mentioned construction of the leveling apparatus for a vehicle lamp according to the present invention, advantageously, the slanting member is formed with a slip-off stop plate for closing the opened one end of the recessed receiving portion.

Still moreover, in the above-mentioned construction of the leveling apparatus for a vehicle lamp according to the present invention, advantageously, the other end of the recessed receiving portion in the vertical direction is closed by a closed wall which is integrally provided with the pivot receiving body.

When the pivot body is inserted into the pivot receiving body, the pivot body need not be pressed against the elastic force of elastic pieces. Therefore, unnatural force is required when both of them are coupled together and coupling efficiency is improvable. It is thus possible to prevent the deformation of and damage to the pivot receiving body at the time the pivot body is inserted into the pivot receiving body.

DETAILED DESCRIPTION OF THE PREFERRED EMBODIMENTS

A detailed description will subsequently be given of an apparatus for leveling a vehicle lamp embodying the present invention as illustrated by the accompanying drawings.

Incidentally, the present invention is applied to an automobile head lamp of a moving reflector type, and more specifically, to the coupling member of a leveling mechanism in an automobile head lamp of such a type in which an optical axis is variable by slanting/tilting a reflector.

FIGS. 5–14 show an apparatus for leveling a vehicle lamp embodying the present invention.

A reflector 1 is tiltably supported with a lamp housing as a stationary-side member (not shown).

Figure 1:
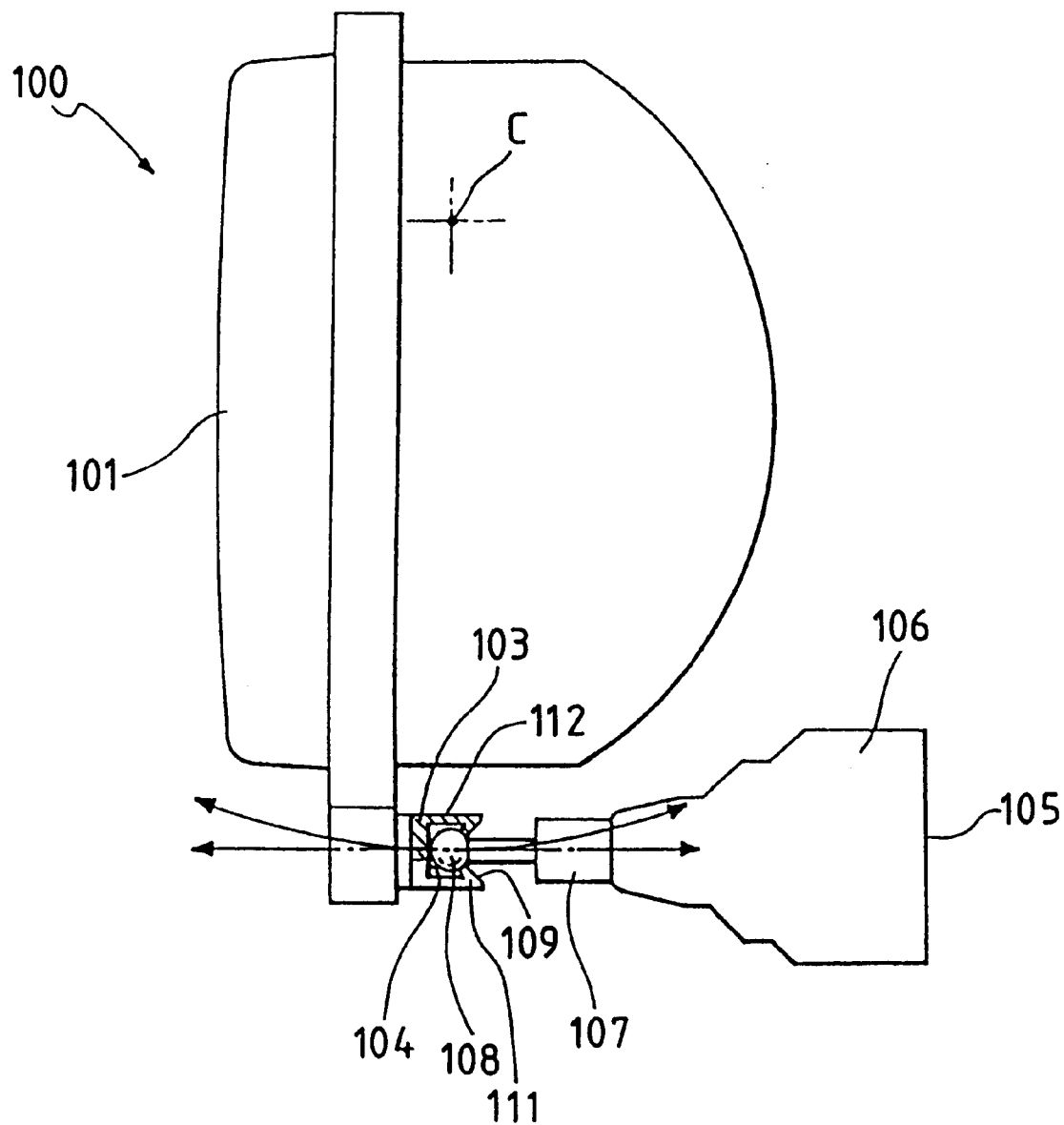
FIG. 1 is a schematic diagram showing an example of a vehicle head lamp having the leveling mechanism.
Figure 2:
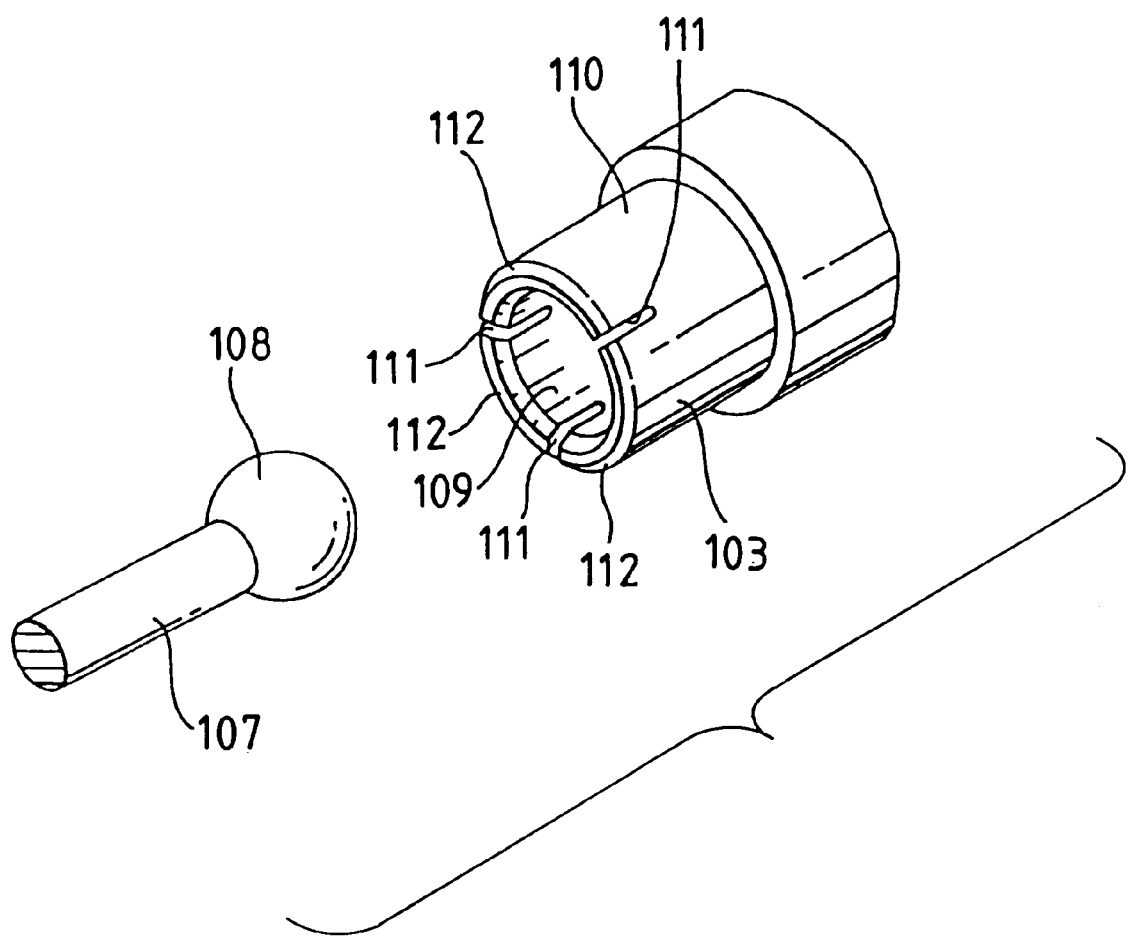
FIG. 2, is an exploded enlarged perspective view of a leveling point, as a principal part of the leveling mechanism.
Figure 3:
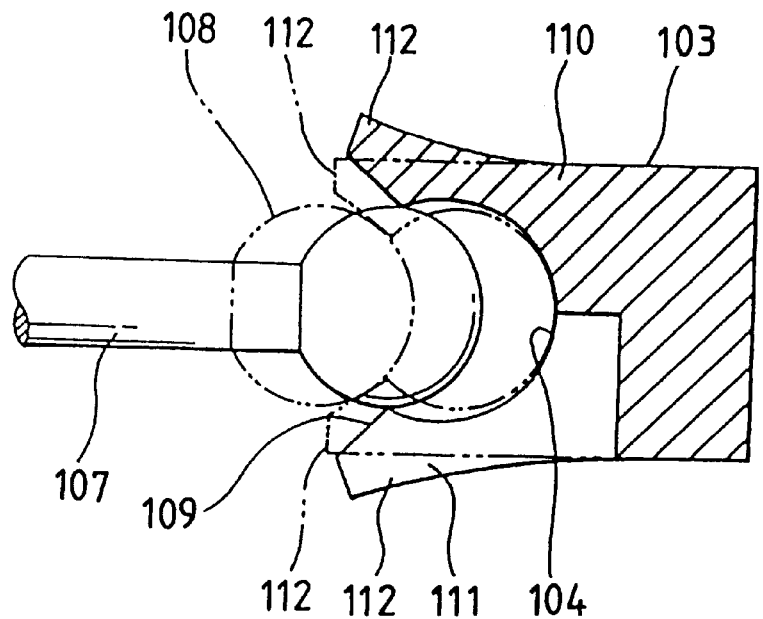
FIG. 3 is an enlarged sectional view showing a state a pivot body has been being inserted into a pivot receiving body.
Figure 4:
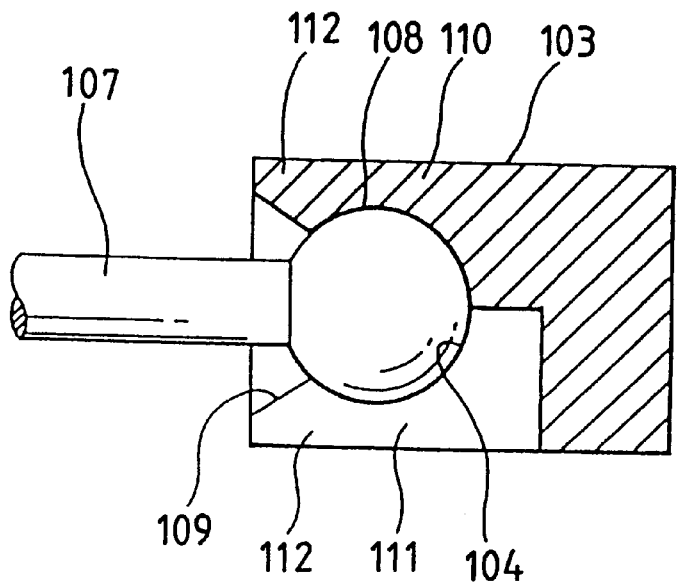
FIG. 4 is an enlarged sectional view showing a state a pivot body is inserted in a pivot receiving body.
Figure 5:
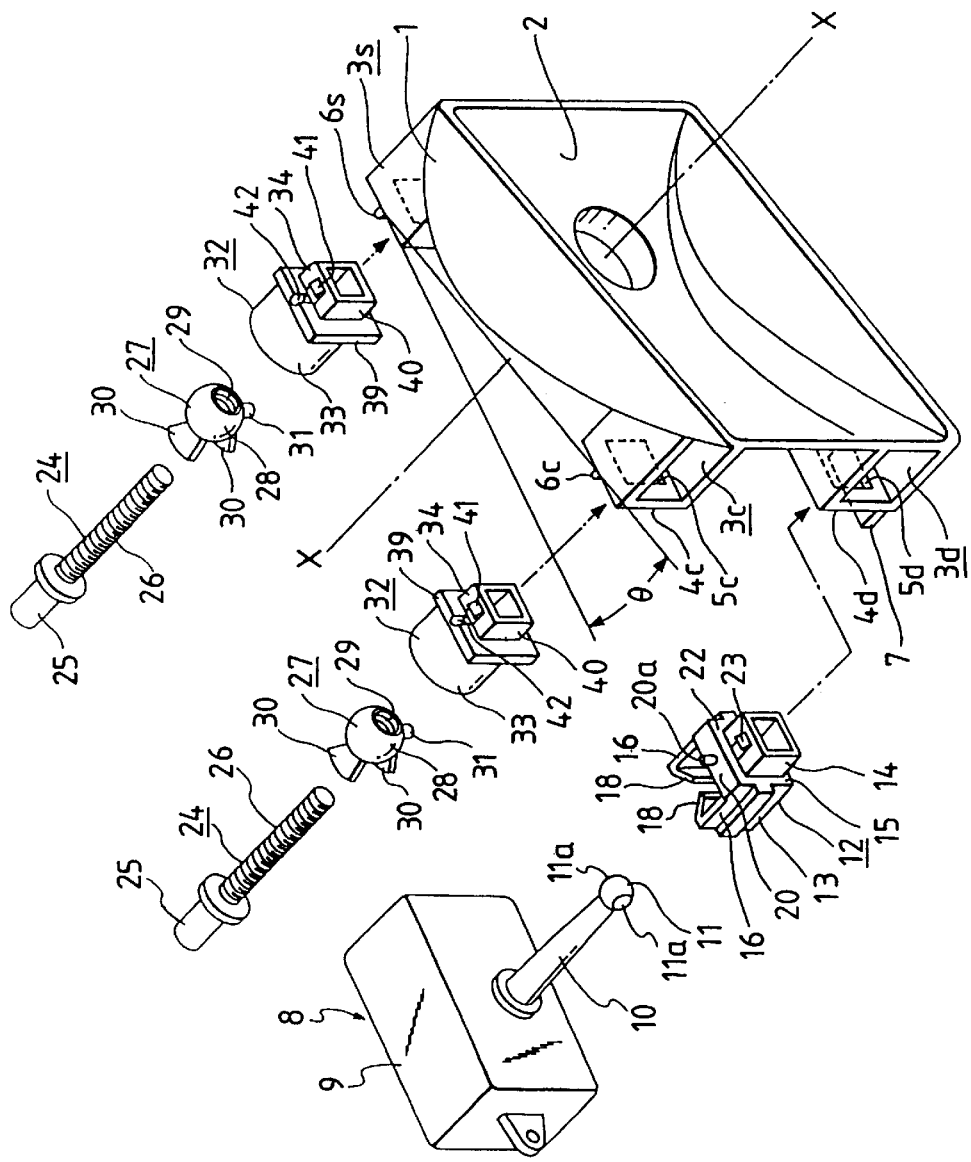
FIG. 5 is an exploded perspective view of the principal part of the leveling apparatus for leveling a vehicle lamp as an embodiment of the present invention.
Figure 6:
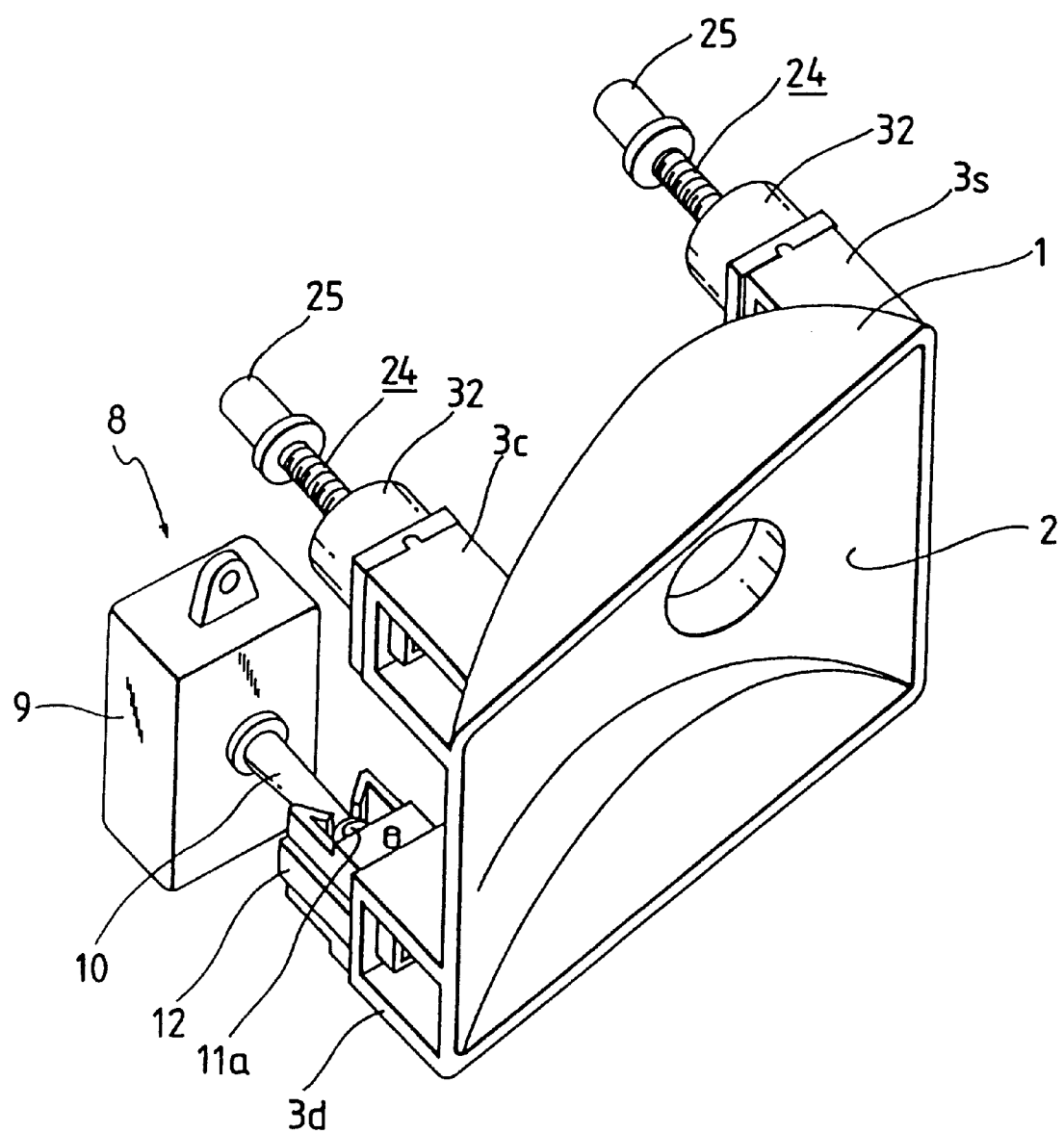
FIG. 6 is a perspective view of a state in which a leveling actuator has been joined to a reflector.
Figure 7:
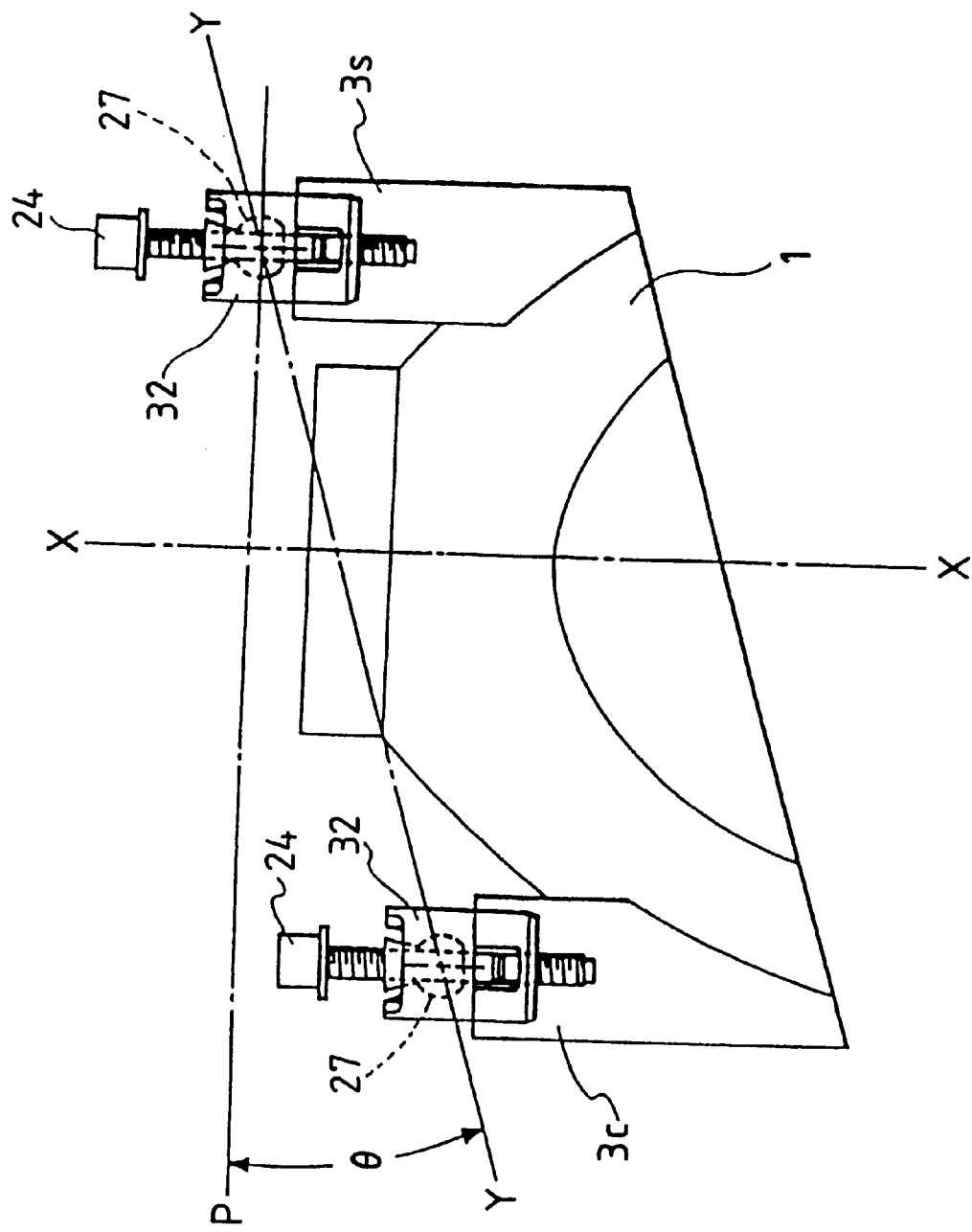
FIG. 7 is a plan view of the principal part.
Figure 8:
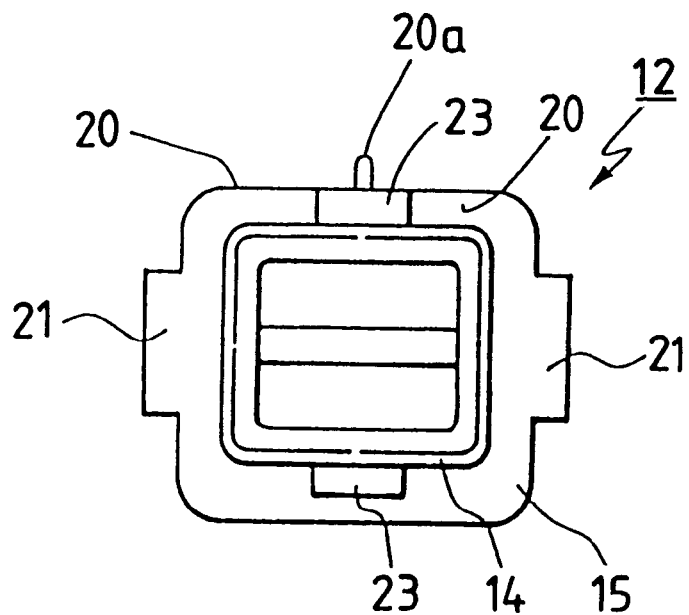
FIG. 8 is an enlarged elevational view of a pivot receiving body.

As shown in FIGS. 5–7, a reflector 1 has a concave surface 2 opening forward and a reflecting surface is formed thereon by adding reflecting properties to the concave surface 2. A light source, for example, a discharge lamp (not shown) is supported with the reflector 1, and the light emitted from the light source is reflected from the reflecting surface 2 before being emanated forward (see FIGS. 5–7).

When a direction is referred to in this specification, however, what is directed to the lower diagonal right of FIG. 5 is defined as the front side, whereas what is directed to the upper diagonal left thereof is defined as the rear side. Further, the direction directed to the upper diagonal right of FIG. 5 is defined as the right side, whereas what is directed to the lower diagonal left thereof is defined as the left side. Moreover, the direction directed upward is defined as the upper side, whereas what is directed downward is defined as the lower side.

As shown in FIGS. 6, three support portions 3c, 3s, 3d are formed on the back side of the reflector 1. These support portions 3c, 3s, 3d have, at their rear ends, support plates 4c, 4s, 4d whose planes are directed in the longitudinal direction, and square support holes 5c, 5s, 5d are formed in the respective support plates 4c, 4s, 4d.

Of the three support portions, the right-side support portion 3s is positioned back from the other support portions 3c, 3d and a line connecting the right-side support portion 3s and the left-side support portion 3c remains slant (at a slant angle of θ) with respect to a plane P perpendicular to the optical axis x—x of the reflector 1 (see FIG. 7). This is based on a demand in view of design-making resulting from a recent trend in vehicle lamps.

Small positioning projections 6c, 6s projected backward are integrally formed with the upper center of the two support plates 4c, 4s and intended to prevent a ball bearing body from being mounted in a wrong direction, which will be described later.

A slip-off stop plate 7 is uprightly provided under the support plate 4d of the support portion 3d and near the lower side edge portion of the support hole 5d, and used to prevent a pivot body from slipping off a pivot receiving body when the pivot body, which will be described later, is joined to the pivot receiving body.

The lower-side support portion 3d separated downward from the intermediate support portion 3c is coupled via a so-called leveling actuator to a lamp housing (not shown).

A coupling shaft 10 is projected forward from the front of the body portion 9 of an leveling actuator 8, and a pivot body 11 is integrally formed at the tip of the coupling shaft 10. In this case, the leveling actuator 8 is fitted in the support hole of the lamp housing by inserting the coupling shaft 10 of the leveling actuator 8 and part of the body portion 9 into the support hole formed in the lamp housing, and turning the leveling actuator 8 by substantially 90 degrees around the coupling shaft 10.

The pivot body 11 is in such a shape that the upper and lower portions of a spherical body are cut with a horizontal plane, so that an upper plane 11a and a lower plane 11a are formed, and exhibits a flat elliptic shape in the vertical direction as viewed axially and a circle as viewed horizontally.

The leveling actuator 8 like this is arranged so that its coupling shaft 10 is remotely or automatically moved in the longitudinal direction.

A pivot receiving body 12 is supported with the lower support portion 3d of the reflector 1.

The pivot receiving body 12 is made of plastics, for example, POM, wherein a pivot receiving portion 13 and a portion to be supported 14 are integrally formed. The pivot receiving portion 13 includes a front end wall 15 on the side of the portion to be supported 14, side walls 16, 16 extending backward from the respective both lateral edges of the front end wall 15, and elastic pieces 18, 18 provided so as to extend inward from the respective rear end edges of the side walls 16, 16 and make their front end edges 17, 17 extend closer to each other.

Figure 9:
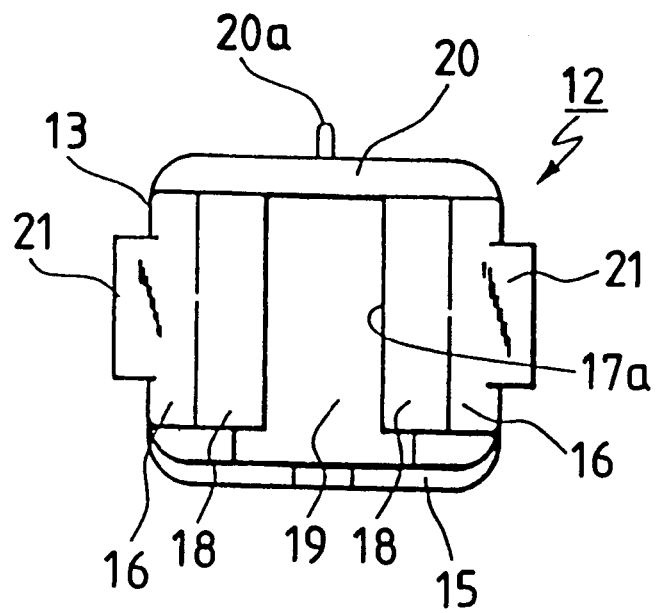
FIG. 9 is an enlarged rear elevational view of the pivot receiving body.

As shown in FIG. 9, recessed receptacle portion 19 in the form of a recess vertically extending is formed on the rear surface of the front end wall 15, and the upper end of the recessed receptacle portion 19 is closed with a closed wall 20, its lower end being opened. Moreover, as shown in FIG. 12, the transverse sectional view of the recessed receptacle portion 19 is semicircular and slightly smaller than one half of a circle.

Figure 10:
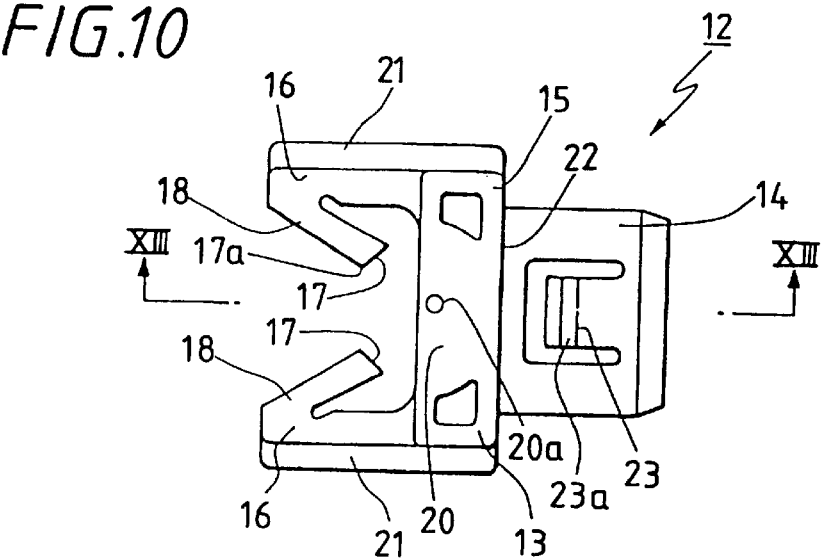
FIG. 10 is an enlarged plan view of the pivot receiving body.
Figure 11:
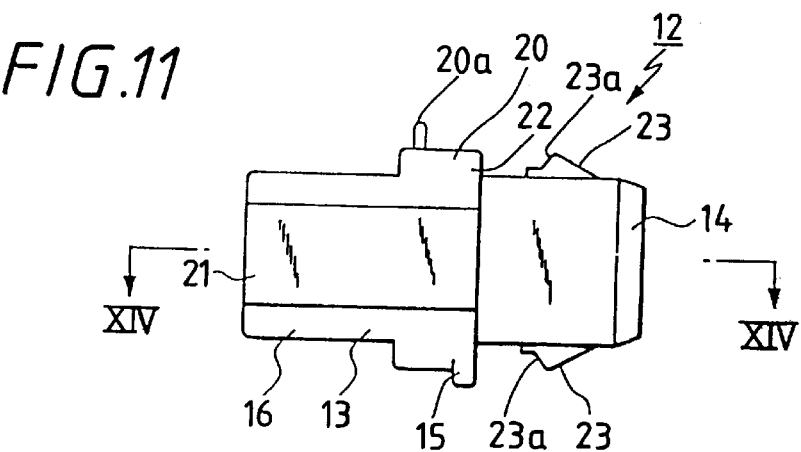
FIG. 11 is an enlarged left-hand side view of the pivot receiving body.

Further, as shown in FIGS. 10 and 11, a projection 20a for preventing an insertion error is projected in the central portion of the surface of the closed wall 20 and as will be described later, used to prevent the inverse insertion when the pivot receiving body 12 is joined to the lower support portion 3d.

Figure 12:
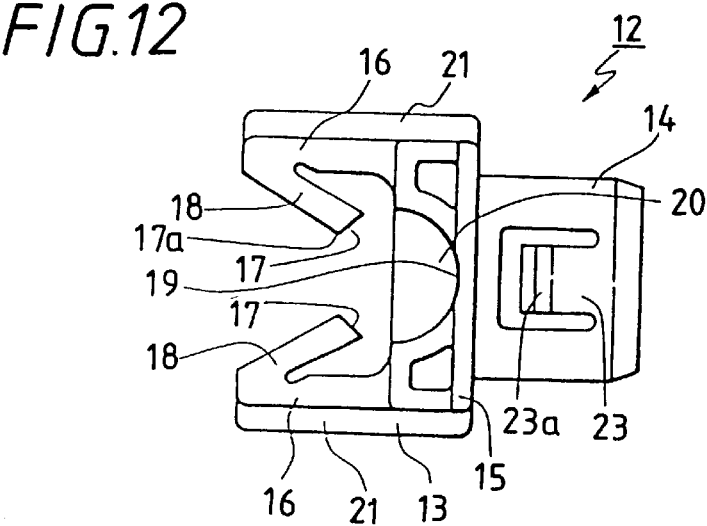
FIG. 12 is an enlarged bottom view of the pivot receiving body.
Figure 13:
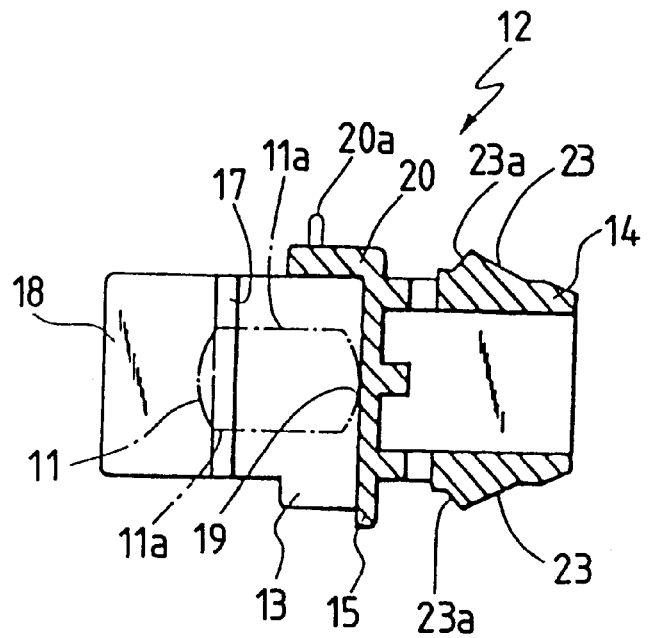
FIG. 13 is a sectional view taken on line XIII—XIII of FIG. 10.
Figure 14:
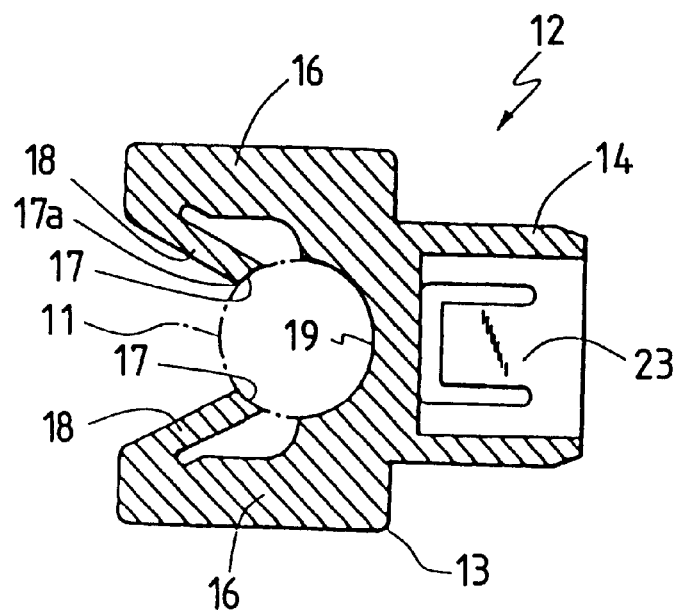
FIG. 14 is a sectional view taken on line XIV—XIV of FIG. 11.

As shown in FIG. 12, the pivot receiving portion 13 of the pivot receiving body 12 is equipped with elastic pieces 18, 18 according to this embodiment of the present invention and the receiving portion is formed into a recess extending vertically. However, the elastic pieces are not essential component elements according to the present invention and not necessarily recessed; this will be explained later.

As shown in FIGS. 8–12, on the side faces of both the lateral side walls, reinforcing portions 21, 21 which are flat and longitudinally extend in the thickness direction of the plates of the side walls 16, 16, whereby rigidness against the bending in the lateral direction of each of the side walls 16, 16 is reinforced.

As shown in FIGS. 10 and 12, the front end edges 17, 17 of the elastic pieces 18, 18 extend to the proximity of the open edge of the recessed receptacle portion 19, and its front edge face is formed so as to make part of an arc on the extension of the arc in the transverse cross section of the recessed receptacle portion 19. The space between the front end edges 17, 17 of the elastic pieces 18, 18 is smaller than the diameter of a circle constituting the arc of the recessed receptacle portion 19, and is set substantially equal to the dimension between the two planes 11a, 11a of the pivot body 11, that is, its width dimension. The space between the front end edges 17, 17 of the elastic pieces 18, 18 is used as an opening 17a for receiving the pivot body 11.

As shown in FIGS. 5, 11 and 12, the portion to be supported 14 is in the form of a prism whose lateral width is slightly greater than the vertical width and its transverse section is formed in a manner one size smaller than the front end wall 15 of the pivot receiving portion 13 and besides its rear end is coupled to the front of the front end wall 15 of the pivot receiving portion 13, whereby a contact surface 22 is formed between the pivot receiving portion 13 and the portion to be supported 14.

Engaging pieces 23, 23 surrounded with U-shaped slits are respectively formed on the upper and lower side walls of the portion to be supported 14 and their front ends are continuous to the upper or lower side wall and, their upper or lower side faces are slanted so that the free ends are projected upward or downward from the respective upper or lower side walls. These engaging pieces 23, 23 may be formed on lateral side walls of the portion to be supported 14.

Although the pivot body is prevented from slipping off by forming the transverse cross section of the receiving recess of the pivot receiving body into the semicircle slightly smaller than one half of a circle and arranging the pair of elastic pieces on the rear side of the pivot body, the present invention is not limited to this arrangement but applicable to making the transverse cross section thereof slightly greater than one half of a circle.

Then the pivot body 11 and the pivot receiving body 12 are joined to the lower support portion 3d of the reflector 1 as follows:

First, the pivot receiving body 12 is joined to the lower support portion 3d of the reflector 1.

Figure 15:
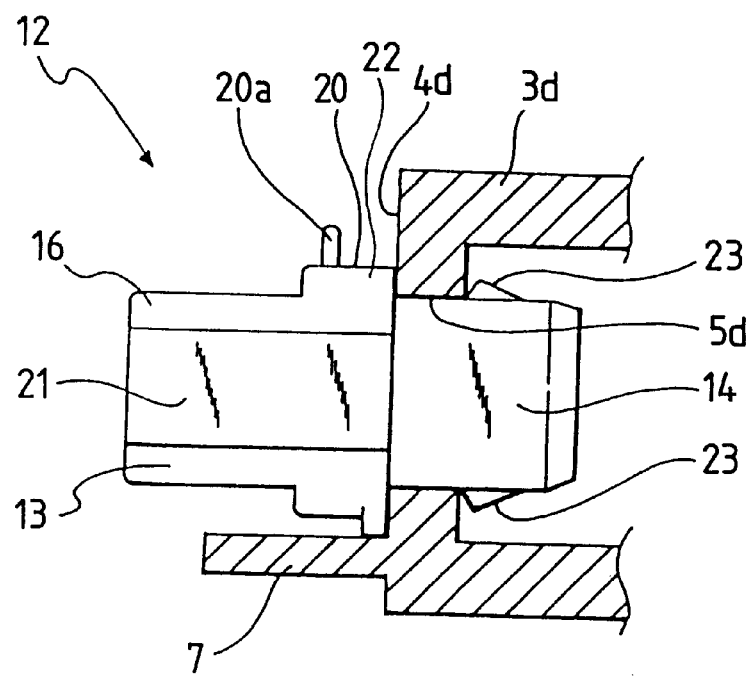
FIG. 15 is an enlarged sectional view showing a state in which the pivot body has been joined to a support portion.
Figure 16:
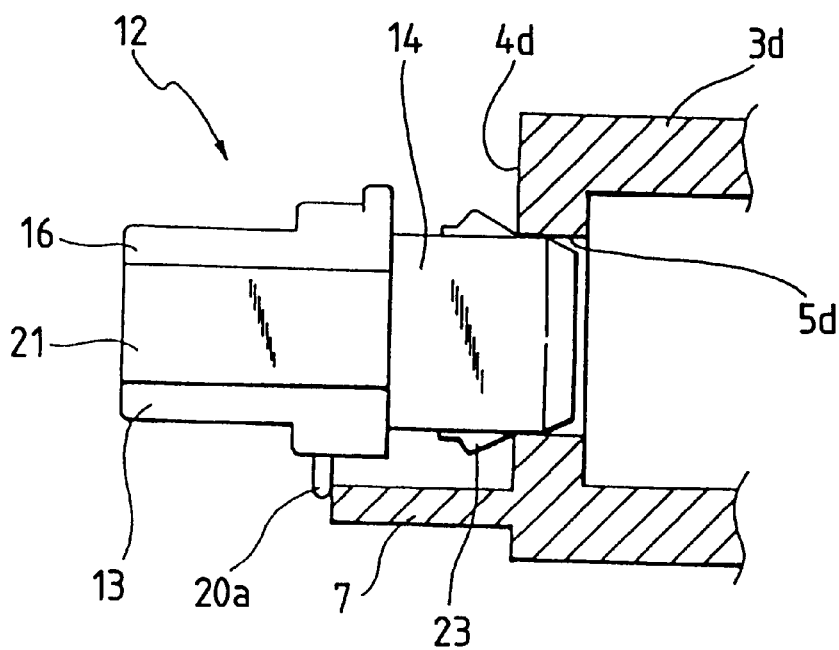
FIG. 16 is an enlarged sectional view showing a state in which the pivot body is reversely joined to a support portion.
Figure 17:
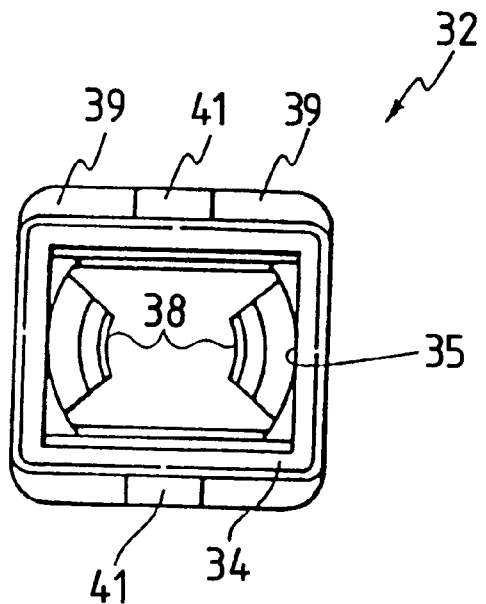
FIG. 17 is an enlarged elevational view of a ball bearing body.
Figure 18:
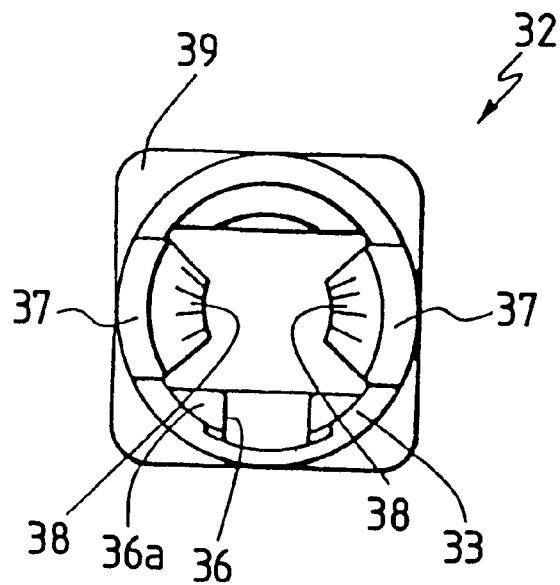
FIG. 18 is an enlarged rear elevational view of the ball bearing body.
Figure 19:
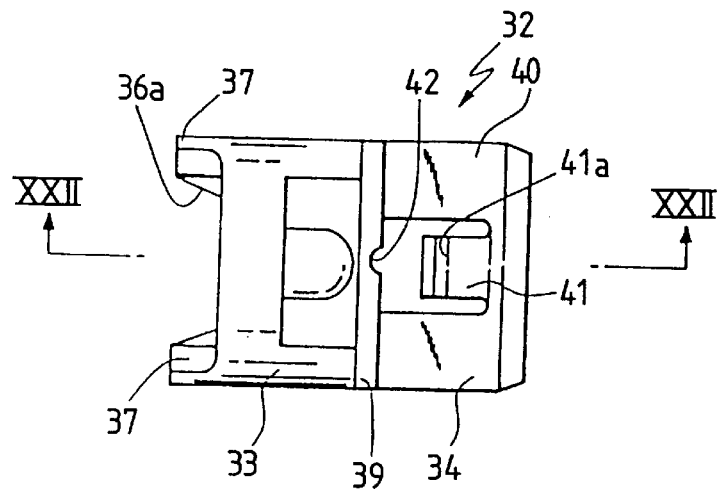
FIG. 19 is an enlarged plan view of the ball bearing body.
Figure 20:
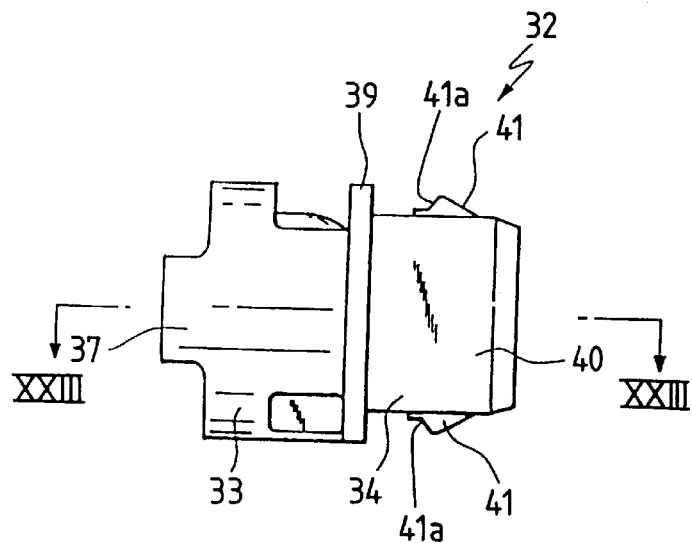
FIG. 20 is an enlarged left-hand side view of the ball bearing body.
Figure 21:
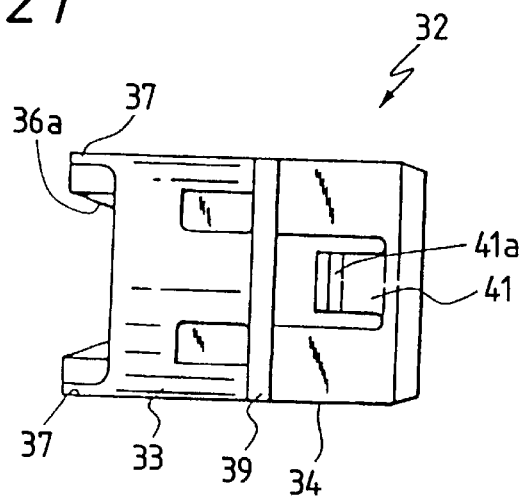
FIG. 21 is an enlarged bottom view of the ball bearing body.
Figure 22:
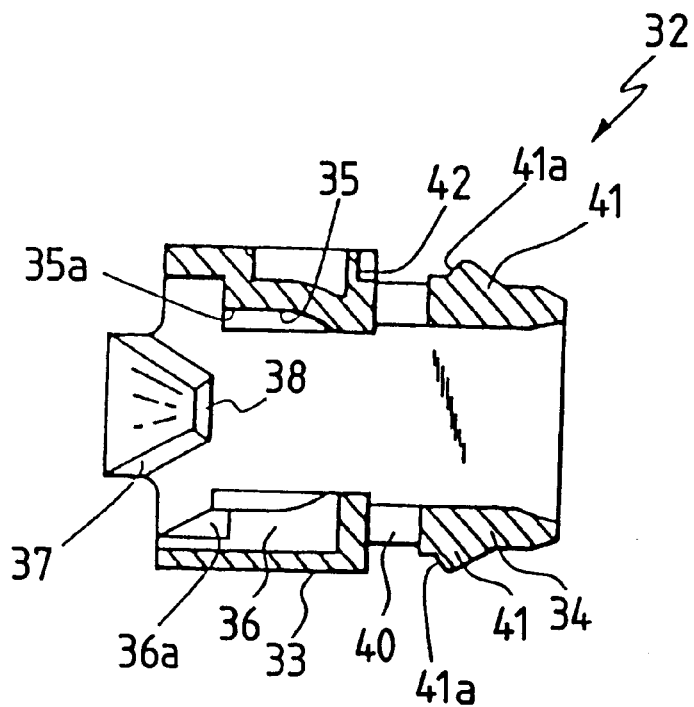
FIG. 22 is a sectional view taken on line XXII—XXII of FIG. 19.

As shown in FIGS. 15 and 16, the portion to be supported 14 of the pivot receiving body 12 is inserted into the support hole 5d of the lower support portion 3d from behind. Then the slanted surfaces of the engaging pieces 23, 23 are pressed by both the upper and lower side edges of the support hole 5d and bent inward. When the contact surface 22 is brought into contact with the rear open edge of the support hole 5d, the engaging pieces 23, 23 attempt to be back to the original condition, whereby the engaging pieces 23, 23 are made to engage with the front open edge of the support hole 5d. Thus, the pivot receiving body 12 is supported with the lower support portion 3d of the reflector 1 so as to clamp the open edge of the support hole 5d with the engaging pieces 23, 23 and the contact surface 22.

If the projection 20a for preventing an insertion error formed on the surface of the closed wall 20 of the pivot receiving body 12 comes into contact with the slip-off stop plate 7 of the support portion 3d, it becomes apparent that the joining direction is reversed. The point is that the pivot receiving body 12 is jointed to the lower support portion 3d in the direction in which the projection 20a for preventing an insertion error does not contact the slip-off stop plate 7 and in the direction in which the recessed receptacle portion 19 is directed vertically. Thus, the insertion error of the lower support portion 3d of the pivot receiving body 12 is prevented.

Then the pivot body 11 of the coupling shaft 10 of the leveling actuator 8 is inserted into the recessed receptacle portion 19 in a direction in which the plane of the pivot body 11 is made perpendicular to the planes 11a, 11a (see FIG. 5) in such a way as to pass the pivot body 11 between the elastic pieces 18, 18 of the pivot receiving body 12, that is, through the opening 17a for receiving the pivot body 11. Thus, the pivot body 11 can be inserted substantially without touching the pivot receiving body 12. In fact, however, the pivot body 11 is inserted into the recessed receptacle portion 19 through the opening 17a while being guided by the elastic pieces 18.

When the leveling actuator 8 is turned by 90 degrees around the coupling shaft 10, the planes 11a, 11a of the pivot body 11 are directed upward or downward and the rear end side portion of the pivot body 11 is brought into contact with the front end edges 17, 17 of the elastic pieces 18, 18, so that the pivot body 11 is prevented from slipping off the recessed receptacle portion 19 at random (see FIG. 6).

Figure 24:
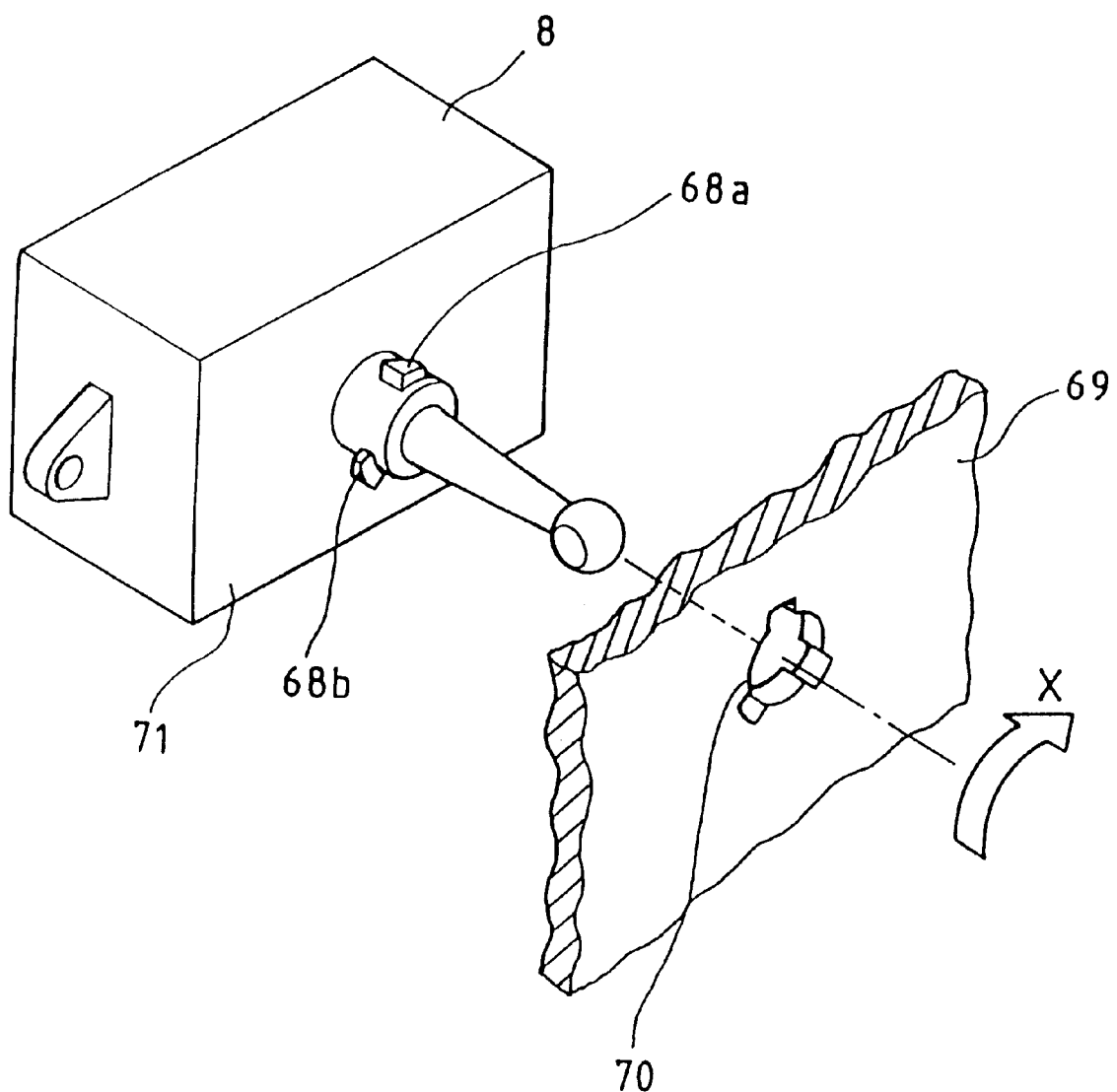
FIG. 24 is a perspective view of principle portion showing a state that tapered flange formed on the leveling actuator is to be assembled with a lamp housing.

Moreover, at this time, the leveling actuator 8 is supported with the support hole of the lamp housing. For example, as shown in FIG. 24, tapered flanges 68a and 68b are, preferably, formed on the leveling actuator 8 in such a manner that when the leveling actuator 8 is turned by 90 degrees along an arrow X around the coupling shaft 10 in order to prevent the pivot body 11 from being slipped off the recessed receptacle portion 19, the wall of the lamp housing 69 disposed around the support hole 70 is fixedly clamped between the tapered flanges 68a and 68b and the body surface of the leveling actuator 8.

Thus, the coupling shaft 10 of the leveling actuator 8 is coupled via the ball bearing body to the pivot receiving body 12 supported with the reflector 1.

When the pivot body 11 of the coupling shaft 10 is removed from the inside of the recessed receptacle portion 19 of the pivot receiving portion 13, the order of joining them is reversed. The leveling actuator 8 is reversely turned by 90 degrees around the coupling shaft 10 and while the leveling actuator 8 is being removed from the lamp housing, the planes of the pivot body 11 are directed perpendicularly. In this state, the pivot body 11 can be pulled backward from the pivot receiving body 12 without interfering with the elastic pieces 18, 18 of the pivot receiving body 12, whereby the pivot body 11 is detached from the pivot receiving portion 13. The leveling actuator 8 can thus be removed from the reflector 1.

Note that since the pivot receiving body 12 is equipped with the elastic pieces 18, 18 according to this embodiment of the present invention, the pivot body 11 and the pivot receiving body 12 can also be jointed together as follows:

While the planes 11a, 11a of the pivot body 11 are directed upward or downward and positioned in the rear of the pivot receiving body 12, the pivot body 11 is attached to the surfaces of the elastic pieces 18, 18 diagonally directed backward and relatively pressed toward the recessed receptacle portion 19. Then the elastic pieces 18, 18 are elastically bent in such a way as to move away from each other and the opening 17a for receiving the pivot body 11 is widened, whereby the pivot body 11 is passed between the front end edges 17, 17 of the elastic pieces 18, 18 and received into the recessed receptacle portion 19. This fitting method is effective for joining the reflector 1 to the lamp housing after the leveling actuator 8 is already joined to the lamp housing. Although the fitting method like this is contrary to the principal object of the present invention characterized by improving coupling efficiency and preventing the deformation of and damage to the elastic pieces, it is effective for increasing the freedom of assembling.

Moreover, the pivot receiving body 12 may be joined to the lower support portion 3d of the reflector 1 after the pivot body 11 is inserted into the pivot receiving body 12 in such a state that the pivot receiving body 12 has not been jointed to the lower support portion 3d of the reflector 1.

In this case, the pivot body 11 is inserted from the lower opening of the recessed receptacle portion 19 of the pivot receiving body 12, and the pivot body 11 is joined to the pivot receiving body 12. Then the portion to be supported 14 of the pivot receiving body 12 is joined to the lower support portion 3d of the reflector 1. This fitting method is effective when the leveling actuator 8 is already joined to the lamp housing.

The intermediate support portion 3c positioned above the lower support portion 3d and the side support portion 3s separated from the intermediate support portion 3c are supported with the lamp housing (not shown) via an aiming mechanism.

The aiming mechanism comprises an aiming screw, a spherical body into which the aiming screw is putted in and a ball bearing body for pivotally supporting the spherical body.

The aiming screw 24 is such that its head portion 25 as an operating portion is integrally formed with a threaded shaft portion 26, and the head portion and the threaded shaft portion are supported so that they are not longitudinally movable but rotatable with respect to the lamp housing (not shown).

A spherical body 27 is formed of plastics, for example, nylon 6 and comprises a substantially spherical body portion 28 and guide pieces 30, 30 projecting from an opening edge on one side of a threaded hole 29 formed on the spherical body portion 28, which is integral with the guide pieces. The guide pieces 30, 30 are formed so that they are increasingly separated as they extend from the threaded hole 29 and their opposed surfaces are made recessed curved surfaces. Moreover, an engaging pin 31 is integrally projected from the outer peripheral face of the spherical body portion 28. The direction in which the engaging pin 31 is projected is the direction in which the guide pieces 30, 30 are arranged and also the direction in which it perpendicularly crosses the axis of the threaded hole 29.

A ball bearing body 32 is formed of plastics, for example, POM and comprises a receptacle portion 33 and a portion to be supported 34, which is integral with the receptacle portion.

Figure 23:
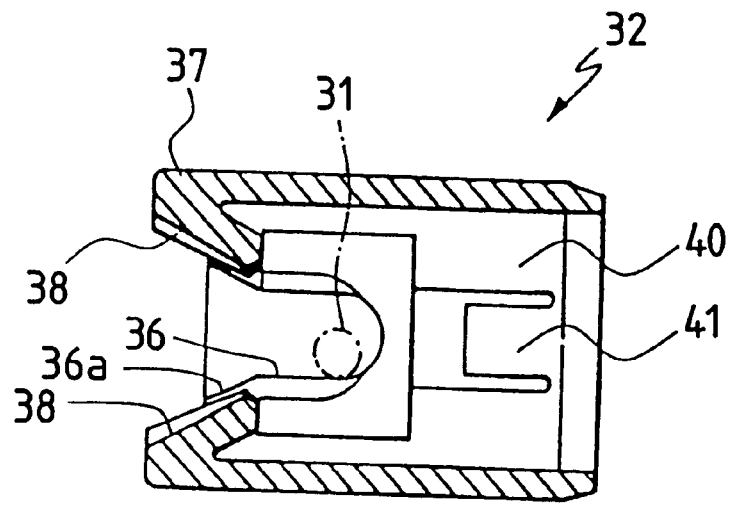
FIG. 23 is a sectional view taken on line XXIII—XXIII of FIG. 20.

The receptacle portion 33 is cylindrical and has a spherical recessed portion 35 opening backward, and a groove 36 having an open rear end is formed in the inner side face of the lower portion of the receptacle portion. The rear end of the groove 36, that is, the open end is formed into a tapered portion 36a whose width is increased backward. Further, the width of the front end portion of the groove 36 is set greater than the engaging pin 31 of the spherical body 27 (see FIG. 23).

The reason for this is that the leveling operation is made performable smoothly without making the locus of the engaging pin 31 of the spherical body 27 and the direction in which the groove 36 is extended interfere with each other at the time of leveling in the case of the slanting reflector 1 fitted to the surface perpendicularly crossing the optical axis x–x, its leveling axis is also slanted with respect to the surface perpendicularly crossing the optical axis x—x (see FIG. 7), and a gap has been produced between the locus of the engaging pin 31 of the spherical body 27 and the direction in which the groove 36 is extended.

The rear end opening of the spherical recessed portion 35, that is, a receptacle opening 35a into which the spherical body 27 is inserted has a cylindrical shape having the same diameter as the maximum diameter of the spherical recessed portion 35.

There are provided projected portions 37, 37 further projecting backward from the rear ends of both lateral side portions of the outer peripheral wall of the receptacle portion 33, and slip-off stop pieces 38, 38 are projected toward the receptacle opening 35a from the rear end of the projected portions 37, 37. The two slip-off stop portions 38, 38 are slanted so that they are increasingly separated from each other as they extend from the receptacle opening 35a and positioned in such a way as to substantially decrease the opening diameter of the receptacle opening 35a in the portion of the receptacle opening 35a. In this case, the opposed surfaces of the two slip-off stop portions 38, 38 are made recessed curved surfaces.

The portion to be supported 34 comprises a flange portion 39 continuous to the receptacle portion 33, a main portion 40 in the form of a substantially prism projecting forward from the front of the flange portion 39, and engaging pieces 41, 41 surrounded with U-shaped slits in the upper and lower side walls. The engaging piece 41 whose front end is continuous to the side wall and whose outer side face is slanted in such a way that its free end is projected from the side wall and besides an engaging stepped portion 41a is formed in the free end portion.

A positioning recessed portion 42 is formed in the upper center of the flange portion 39, and the positioning recessed portion 42 corresponds to the projections 6s, 6c formed on the upper support plates 4s, 4c of the support portion 3 of the reflector 1.

The spherical body 27 is inserted into the spherical recessed portion 35 of the ball bearing body 32 and rotatably supported with the ball bearing body 32. Since the spherical body 27 is such that its engaging pin 31 slidably engages with the groove 36 of the ball bearing body 32, however, the spherical body 27 is not made rotatable around the axis of the threaded hole 29. Strict speaking, since the width of the groove 36 is greater than the engaging pin 31, the spherical body 27 is made to rotate slightly when the spherical body 27 is rotated and then stopped from rotating at a point of time the engaging pin 31 comes into contact with the edge portion of the groove 36.

When the spherical body 27 is inserted into the spherical recessed portion 35 of the ball bearing body 32, the two slip-off stop portions 38, 38 which are positioned on the rear side of the receptacle opening 35a of the spherical recessed portion 35 so as to hold the receptacle opening 35a therebetween are caused to bend so that the slip-off stop portions 38, 38 are gradually set apart from each other. Although the spherical body 27 is easily received into the spherical recessed portion 35 then, the spherical body 27 is prevented from slipping off the spherical recessed portion 35 at random since the front end portions of the slip-off stop portions 38, 38 are positioned so as to substantially narrow the opening diameter of the receptacle opening 35a when the spherical body 27 is received into the spherical recessed portion 35 once.

Moreover, the slip-off stop portions 38, 38 also serve as guides when the spherical body 27 is inserted into the spherical recessed portion 35, so that the positioning of the spherical body 27 is facilitated at the time of fitting the spherical recessed portion 35 in.

When the engaging pin 31 is slidably engaged with the groove 36, the engaging pin 31 can easily be engaged with the groove 36 as the rear end portion of the groove 36 has been formed into the tapered portion 36a. It is thus unnecessary to strictly position the spherical body 27 when the spherical body 27 is inserted into the spherical recessed portion 35.

Then the ball bearing bodies 32, 32 are supported with the support portions 3c, 3s of the reflector 1. In other words, the portions to be supported 34, 34 of the ball bearing bodies 32, 32 are substantially identical in structure to the portion to be supported 14 of the pivot receiving body 12 and when the portions to be supported 34, 34 are inserted into the support holes 5c, 5s of the support portions 3c, 3s from behind, the engaging stepped portions 32a, 32a, . . . of the engaging pieces 23, 23, . . . are engaged with the front opening edges of the support holes 5c, 5s, whereby the ball bearing bodies 32, 32 are supported with the support portions 3c, 3s.

At this time, the projection 6c or 6s of the support plate 4c or 4s is fitted into the positioning recessed portion 42 formed in the flange portion 39 of the ball bearing body 32, whereby the projection is never fitted in a wrong direction as that direction with respect to the support portion 3c or 3s of the ball bearing body 32 is unitarily determined.

The threaded shaft portions 26, 26 of the aiming screws 24, 24 are screwed into the threaded holes 29, 29 of the spherical bodies 27, 27, so that the support portions 3c, 3s of the reflector 1 are coupled by the aiming mechanism to the lamp housing (not shown).

When the coupling shaft 10 of the leveling actuator 8 is moved longitudinally, the reflector 1 is slanted with a line connecting the spherical bodes 27, 27 in the intermediate and side support portions 3c, 3s and the spherical recessed portions 35, 35 of the ball bearing bodies 27, 27 as a slanting axis y—y.

Since the pivot body 11 of the coupling shaft 10 of the leveling actuator 8 is engaged with the vertically long recessed receptacle portion 19 of the pivot receiving body 12, the vertical movement of the pivot body 11 within the recessed receptacle portion 19 results in absorbing the positional gap so as to allow the reflector 1 to slant smoothly even when there develops such a positional gap between the lower support portion 3d of the reflector 1 and the position where the coupling shaft 10 is situated as the reflector 1 vertically slants.

Although the lower side of the recessed receptacle portion 19 of the pivot receiving body 12 is opened, this opening is closed by the slip-off stop plate 7 formed in the support portion 3d and the pivot body 11 thus joined is prevented from slipping off the pivot receiving body 12 downward. Consequently, the pivot body 11 is never caused to slip off the pivot receiving body 12 without unnecessarily increasing the vertical length of the recessed receptacle portion 19 of the pivot receiving body 12.

When the aiming screw 24, 24 is rotated, the threaded shaft portion 26 is screwed into the spherical body 27 or unscrewed depending on the direction of rotation, and the reflector 1 is slanted with a line connecting the coupling portion between the pivot body 11 of the coupling shaft 10 of the leveling actuator 8 and the recessed receptacle portion 19 of the pivot receiving body 12 with the coupling portion between the spherical body 27 in the other support portion 3c or 3s and the spherical recessed portion 35 of the ball bearing body 32 as a slanting axis.

Although a description has been given of the case where the present invention is applied to the reflector used as a slanting member, the invention may needless to say be applicable to a so-called lamp unit for use as the slanting member including a lamp body whose front opening is covered with a lens, and a light source installed therein. In short, the slanting member according to the present invention designates a member for altering an optical axis, that is, the irradiating direction of a lamp for use.

According to this embodiment of the present invention, moreover, the adjusting rod is equipped with the pivot body and the pivot receiving body is provided for the reflector as a slanting member so that the pivot body and the pivot receiving body are coupled together. However, the present invention is not limited to the embodiment above but may be reduced into practice by providing the pivot body in the slanting member, and the pivot receiving body on the adjusting rod side.

As is obvious from the description given above, the apparatus for leveling a vehicle lamp according to the present invention is such that the opening of the pivot receiving body is formed in a non-circular shape; the cross sectional shape of the pivot body in a direction perpendicular to the axis of the pivot body is formed so that the pivot body can be inserted into the opening of the pivot receiving body in at least one direction; and the cross sectional shape of the pivot body cannot be inserted into the opening of the pivot receiving body in at least the other direction; and the pivot body is prevented from slipping off the pivot receiving body by turning the pivot body by a predetermined angle around the axis of the pivot body after the pivot body is inserted into the pivot receiving body.

When the pivot body is inserted into the pivot receiving body, the pivot body need not be pressed against the elastic force of elastic pieces. Therefore, unnatural force is required when both of them are coupled together and coupling efficiency is improvable. It is thus possible to prevent the deformation of and damage to the pivot receiving body at the time the pivot body is inserted into the pivot receiving body.

In the present invention, since the elastic pieces are used as members for forming the opening of the pivot receiving body, the freedom of joining the pivot body and the pivot receiving body can be increased.

In the present invention, since the inner surface of the pivot receiving body is formed into the recessed receiving portion which is arcuate in transverse cross section and extended in the vertical direction, the pivot body becomes movable in the direction in which the recessed receiving portion is extended and the vertical gap between the pivot body and the pivot receiving body at the time of leveling also becomes absorbable, whereby the smooth leveling operation is performed.

In the present invention, since the opening is formed at one end of the recessed receiving portion in the direction in which the recessed receiving portion of the pivot receiving body is extended, the freedom of joining the pivot body and the pivot receiving body can be increased.

In the present invention, since the pivot receiving body is detachably supported with the slanting member and when the pivot body is fitted to the slanting member, the slanting member is formed with a slip-off stop plate for closing one end of an opening in the direction in which the recessed receiving portion is extended, the pivot body is prevented from slipping off the pivot receiving body when the slanting member is slanted. Thus, pivot receiving body can be small-sized.

Although a description has been given of the pivot body exhibiting a flat elliptic shape in the vertical direction as viewed axially according to the above embodiment of the present invention, the present invention is not limited to that embodiment thereof but may be reduced into practice by axially turning a polygon at a predetermined angle in order to prevent the pivot body from slipping off the pivot receiving body.

Moreover, the shape and structure of each component according to the above embodiment of the present invention show only those embodying the present invention and it is to be understood that the scope of the present invention is technically restricted thereby.

What is claimed is:

1. A leveling apparatus for a vehicle lamp comprising:
   a stationary member fixed to a vehicle body;
   a slanting member (1) tiltably supported with respect to said stationary member (69) so as to adjust an optical axis of said vehicle lamp;
   a pivot receiving body (12) disposed on said slanting member (1); and
   an actuator (8) coupled with said pivot receiving body (12) for vertically slanting said slanting member (1), said actuator (8) including a driving rod (10) with a pivot body (11) which is formed at a tip end of the driving rod (10) and is coupled with said pivot receiving body (12), said pivot body being formed in a non-circular shape in a cross-section perpendicular to an axial direction of the driving rod;

wherein said pivot receiving body (12) is provided with a recessed receptacle portion (19) into which said pivot body (11) is inserted and an opening (17a) communicating with said recessed receptacle portion (19);

said pivot body (11) is insertable and releasable through said opening (19) into and from said recessed receptacle portion in said axial direction while said pivot body (12) is in a first posture, and said opening (19) is capable of preventing said pivot body from being inserted into and released from said recessed receptacle portion (19) in said axial direction while said pivot body (12) is in a second posture which is defined by turning said pivot body (11) in said first posture about said axial direction by a predetermined angle.

2. The leveling apparatus for a vehicle lamp according to claim 1, wherein said pivot receiving body (12) comprises a plurality of elastic pieces (18) which define said opening.

3. The leveling apparatus for a vehicle lamp according to claim 1, wherein said recessed receiving portion (19) is arcuate in a cross section in a plane containing a rotational axis of said rod, and is extended in a vertical direction perpendicular to said axial direction.

4. The leveling apparatus for a vehicle lamp according to claim 2, wherein said recessed receiving portion (19) is arcuate in a cross section in a plane containing a rotational axis of said rod, and is extended in a vertical direction perpendicular to said axial direction.

5. The leveling apparatus for a vehicle lamp according to claim 3, wherein one end of said recessed receiving portion (19) in the vertical direction is opened.

6. The leveling apparatus for a vehicle lamp according to claim 4, wherein one end of said recessed receiving portion (19) in the vertical direction is opened.

7. The leveling apparatus for a vehicle lamp according to claim 5, wherein said slanting member (1) is formed with a slip-off stop plate for closing said opened one end of said recessed receiving portion (19).

8. The leveling apparatus for a vehicle lamp according to claim 6, wherein a slip-off stop plate (7) is provided on said slanting member (1) for closing said opened one end of said recessed receiving portion (19).

9. The leveling apparatus for a vehicle lamp according to claim 5, wherein the other end of said recessed receiving portion (19) in the vertical direction is closed by a closed wall (20) which is integrally provided with said pivot receiving body (12).

10. The leveling apparatus for a vehicle lamp according to claim 6, wherein the other end of said recessed receiving portion (19) in the vertical direction is closed by a closed wall (20) which is integrally provided with said pivot receiving body (12).

* * * * *